United States Patent
Karri et al.

(10) Patent No.: US 11,971,691 B2
(45) Date of Patent: Apr. 30, 2024

(54) MANAGEMENT OF DEVICES IN A SMART ENVIRONMENT

(71) Applicant: International Business Machines Corporation, Armonk, NY (US)

(72) Inventors: Venkata Vara Prasad Karri, Visakhapatnam (IN); Saraswathi Sailaja Perumalla, Visakhapatnam (IN); Sarbajit K. Rakshit, Kolkata (IN); Sekhar Reddy Dandu Reddy, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/484,500

(22) Filed: Sep. 24, 2021

(65) Prior Publication Data

US 2023/0102294 A1    Mar. 30, 2023

(51) Int. Cl.
*G05B 15/02* (2006.01)

(52) U.S. Cl.
CPC .................................... *G05B 15/02* (2013.01)

(58) Field of Classification Search
CPC ...................................................... G05B 15/02
See application file for complete search history.

(56) References Cited

U.S. PATENT DOCUMENTS

| | | | |
|---|---|---|---|
| 7,603,273 B2 | 10/2009 | Poirier | |
| 10,127,906 B1 | 11/2018 | Mutagi | |
| 2014/0098247 A1 | 4/2014 | Rao | |
| 2017/0201791 A1 | 7/2017 | Fu | |
| 2018/0253459 A1* | 9/2018 | Srinivasan Natesan | ..................... G06Q 10/00 |
| 2020/0175976 A1 | 6/2020 | Rakshit | |
| 2021/0082308 A1* | 3/2021 | Liu | .................. H04L 12/40013 |

FOREIGN PATENT DOCUMENTS

| | | | | |
|---|---|---|---|---|
| CN | 105263044 A | | 1/2016 | |
| CN | 107528755 A | | 12/2017 | |
| CN | 111028829 A | | 4/2020 | |
| CN | 111681650 A | | 9/2020 | |
| CN | 113662446 A | * | 11/2021 | |
| WO | WO 2016/000463 A1 | * | 1/2016 | ............. G05B 19/04 |

OTHER PUBLICATIONS

Anonymous. "Link your voice to your devices with Voice Match." Printed Jul. 7, 2021. 2 pages. Published by Google. https://support.google.com/assistant/answer/9071681?co=GENIE.Platform%3DAndroid&hl=en.
Anonymous. "Speech-to-text." Printed Jul. 7, 2021. 13 pages. Published by Google. https://cloud.google.com/speech-to-text.
(Continued)

*Primary Examiner* — Michael W Choi
(74) *Attorney, Agent, or Firm* — Haley J. McClory (57) ABSTRACT

A processor may receive instructional information. The instructional information may be associated with an instructional media. A processor may analyze the instructional information for one or more instructions. A processor may identify a target device from the one or more smart devices in the smart environment that are associated with the one or more instructions. A processor may perform the one or more instructions with the target device.

20 Claims, 5 Drawing Sheets

(56) References Cited

OTHER PUBLICATIONS

Mell, et al., "The NIST Definition of Cloud Computing," Recommendations of the National Institute of Standards and Technology, U.S. Department of Commerce, Special Publication 800-145, Sep. 2011, 7 pgs.
Whitwam, Ryan, "Multi-user voice recognition is rolling out to Google Home today." Published Apr. 20, 2017. 10 pages. Published by Android Police. https://www.androidpolice.com/2017/04/20/multi-user-voice-recognition-rolling-google-home-today/.
The International Search Report and Written Opinion of the International Searching Authority, Agent's File Reference, F22W2814, International application No. PCT/CN2022/117033, International filing date Sep. 5, 2022, dated Oct. 26, 2022, 9 pages.

* cited by examiner

MANAGEMENT OF DEVICES IN A SMART ENVIRONMENT

BACKGROUND

The present disclosure relates generally to the field of artificial intelligence, and more particularly to the field of smart devices.

Computing devices or other smart devices have evolved over time to accomplish various tasks for humans, making our lives easier. Such devices can be found in people's homes and offices to assist people with some aspect of their day. As these devices have grown in popularity, so too has demand to make these devices more useful and able to enhance users' daily experience.

SUMMARY

Embodiments of the present disclosure include a method, computer program product, and system for managing an activity collaboratively performed by a user and one or more devices in an smart environment. A processor may receive an instructional media, wherein the instructional video includes a set of instructions for a user to perform. A processor may analyze the instructional media for a set of instructions. A processor may identify a target smart device from the one or more smart devices in the smart environment that are associated with the set of instructions. A processor may instruct the particular smart devices to perform the set of instructions associated with the particular smart device.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of artificial intelligence, and more particularly to smart devices. While the present disclosure is not necessarily limited to such applications, various aspects of the disclosure may be appreciated through a discussion of several examples using this context.

The demand for personal computing devices (e.g., smart devices) has risen significantly over the years as the usefulness of such devices has expanded into both a person's home and work-life. Often such devices connect to one or more other devices or networks, allowing the devices to interact with each other and provide more utility for a user. For example, a user of a smart device may be able to order a product from a website using voice commands and have the product shipped directly to them. The usefulness of such smart devices is compounded when combined with artificial intelligence (AI). Such AI enabled computing devices can be configured into a type of virtual assistant and generate an AI assistance system capable of performing complex tasks (e.g., tasks traditionally performed by a personal assistant).

Traditional AI assistance systems often include one or more computing devices or smart devices configured to receive one or more voice commands from a user and execute those activities or provide information to the user. Unfortunately, in order to perform complex tasks traditional AI assistance systems, require a user to issue each command. In situations where the user is themselves performing a complex activity, the process of following instructions and issuing commands may become confusing and cumbersome. For example, in situations where a user is following a cooking tutorial in a traditional AI assistance system, the user would be required to listen to the instructions of the cooking tutorial, issue commands to the AI assistance system (e.g., preheat oven temperature to 350° F.), and perform tasks related to the instructions themselves (e.g., chop vegetables). In this example, a user will likely waste time and increase the likelihood of confusion by having to pause, rewind, or restart the cooking tutorial to while performing the different tasks. As such, there is a desire for one or more smart devices (e.g., within an smart environment) to collaboratively performing an activity based, at least in part, on an instructional media.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

It will be readily understood that the instant components, as generally described and illustrated in the figures herein, may be arranged and designed in a wide variety of different configurations. Accordingly, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the FIGS., any connection between elements can permit one-way and/or two-way communication even if the depicted connection is a one-way or two-way arrow.

Also, any device depicted in the drawings can be a different device. For example, if a mobile device is shown sending information, a wired device could also be used to send the information. The term "module" may refer to a hardware module, software module, or a module may be a combination of hardware and software resources. Embodiments of hardware-based modules may include self-contained components such as chipsets, specialized circuitry, one or more memory devices and/or persistent storage. A software-based module may be part of a program, program code or linked to program code containing specifically programmed instructions loaded into a memory device or persistent storage device of one or more data processing systems operating as part of the computing environment (e.g., smart environment 100). For example, data associated with action module 104, depicted in FIG. 1, can be loaded into memory or a database.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

In embodiments discussed herein, solutions are provided in the form of a method, system, and computer program product, for managing an activity performed by a user and one or more smart devices in an smart environment. Traditional AI assistance systems traditionally rely on user to provide each command the user wants the AI assistance system to perform/execute. As such, in an smart environment with a traditional AI assistance system, a user would be required to issue a command to each smart device they require to perform an action. For example, in situations where a user may be following an cooking tutorial (e.g., instructional media) that depicts a video showing that the user needs to preheat the oven to a particular temperature, mix egg whites, and chop vegetables, a user would have to issue a command to the oven to preheat at a particular temp, issue a command to the mixer/blender to mix the egg whites, while the user also chops vegetables. Such traditional AI assistance systems would require the user to orchestrate each device utilized in the smart environment.

Embodiments contemplated herein enable a user and one or more smart devices to perform the activity (e.g., cooking tutorial) in a collaborative manner. In embodiments, a processor may receive and analyze instructional media (e.g., cooking tutorial) for at least one instruction (e.g., preheat oven to 375° F.). A processor may then analyze one or more smart devices in the smart environment and identify a target device (e.g., a smart oven or toaster oven) capable of performing the at least one instruction. Once identified, a processor may instruct the target device to perform the at least one instruction.

In embodiments, a processor may detect a user is viewing an instructional media (e.g., on a mobile phone or laptop) in an smart environment. An smart environment may refer to any environment (e.g., a particular room, set of rooms, house, office building, conference room, etc.) having one or more smart devices configured to communicate within a network. In some embodiments, a processor may be configured to control and/or interact with the one or more smart devices to perform various actions within the environments. These actions may range in complexity and may include, but are not limited to, turning one or more utilities (e.g., water, gas, electricity, etc.) on or off at a particular location (e.g., filling a tank with drinking water), controlling a one or more smart device (e.g., turning on a smart food processor). Smart devices may be either mobile or static. For example a smart oven may be a static smart device, while a smart toaster oven may be moved from one are of the smart environment to another.

In some embodiments, a processor may collect real-time information associated with the smart environment from one or more data collection devices (e.g., Internet of Things (IoT) devices). For example, a processor may use one or more data collection devices to collect/receive information from the smart environment including, but not limited to, information associated with each of the one or more smart devices, information associated with the user or users within the smart environment, and other data associated with the environment of the smart environment (e.g., audio and/or video associated with the instructional media). The one or more data collection devices may be configured within the smart devices or configured independently throughout the smart environment. In embodiments, information collected from data collection devices may be included as instructional information.

In embodiments, a processor may analyze data/information collected from the smart environment to generate an understanding of the capabilities of each of the one or more smart devices configured within the smart environment. Capabilities of a smart device may include any action or function the smart device may be configured for. A capability may include, but is not limited to, the action/function of the smart device (e.g., heating, cooling, mixing, etc.), the different settings of each smart device (e.g., low/high heat range, power settings, etc.), and size or volume limitations associated with the particular smart device (e.g., ovens typically have a larger baking area compared to microwaves or toaster ovens). For example, the capabilities of a smart blender may be able to blend a mixture at a particular speed or setting (e.g., mix, puree, stir, chop, or liquefy).

In some embodiments, one or more capabilities of one smart device may overlap with the capabilities of another smart device. For example, while some smart devices within the smart environment may be different, the different smart devices may be configured to perform similar functions. In one example embodiment, a processor may analyze the kitchen (e.g., smart environment) an determine that there is a smart oven, a smart toaster oven, and a smart food processor. In this example embodiment, a processor may receive information from one or more data collection devices and determine that while the smart oven and smart toaster oven are different smart devices, in some instances the smart toaster oven may perform similar actions (e.g., because they share similar capabilities) as a smart oven, such as bake or broil something at particular temperature). In some embodiments, a processor determine the capabilities of the one or more smart devices by generating a digital twin of the smart environment that may mimic different aspects of the one or more smart devices and simulate different capabilities.

In embodiments, an instructional media may include any video or audio that may include at least one instruction or step, such as a craft tutorial or cooking lesson, associated with performing an activity. An activity may include cooking, crafting, playing an instrument, or any other endeavor a user may desire to receive instruction on. While in some embodiments, a processor may collect and analyze information associated with the smart environment (e.g., via data collection devices) and determine an instructional media is being played, in other embodiments, a processor may receive a command from a user indicating to the processor that an instructional media is being played. In these embodiments, a processor may receive a command from the user that, based on the instructional media, the processor should perform or execute at least one instruction without the user's input regarding what the at least one instruction or set of instructions are. In such embodiments, a processor may perform an authentication process to ensure the user issuing the command has sufficient permission to issue such a command (e.g., for the processor to receive instruction from a source separate from the user). In embodiments, a processor may be configured to receive commands (e.g., via data collection devices) from a user using verbal/audible means and/or commands issued by a user with gestures.

In embodiments, a processor may analyze the command issued by the user and determine if the user issuing the command has a valid permission level. A processor may determine if a user has a valid permission level using one or more methods, including, but not limited to, using AI capabilities, voice recognition, or biometric parameter recognition (e.g., fingerprint). In embodiments, a processor may have access to one or more user profiles associated with each user. In these embodiments, a processor may access the one or more user profiles to identify the particular user and determine if the user has a valid permission level to issue the command. A user profile may have one or more identity components a processor may utilize to confirm a user's identity. Identity components may include, but are not limited to, voice identifying data, face identifying data, and device identifying data (e.g., IP address associated with a particular device). For example, a processor may be configured to analyze a user's voice (e.g., analyzing the power bandwidth of the voice) and identify the user (e.g., using voice recognition techniques) using voice identifying data compiled in a user profile.

In embodiments where a processor has determined the user has a valid permission level, the processor may receive/collect instructional information associated with the instructional media. In embodiments, a processor may collect real-time data, or instructional information, as the user is playing the instructional media in the smart environment. As the instructional information is collected, a processor may utilize various methods to analyze the instructional media. A processor may configure an instruction generation engine (e.g., using artificial intelligence (AI) and machine learning capabilities) to perform an image content analysis and/or an audio content analysis to extract one or more instructions (e.g., via generated transcripts using natural language processing) associated with the audio and/or the images of the instructional media.

In embodiments, a processor may configure an instruction generation engine to analyze and identify one or more instructions from the instructional information. In these embodiments, instructional information may include a variety of information that a processor may accumulate during analysis, such as the information/data used and/or generated by AI and machine learning techniques (e.g., historical data) or gathered by data collection devices configured within the smart environment. Instruction information may also include, information generated by natural language processing (NLP) or other analyses associated with determining the general meaning of the instructional media (e.g., knowledge corpus), and/or any other data/information that may be used to determine/identify one or more instructions. While embodiments discussed herein may provide examples having referred to a single instruction, any number of instructions and smart devices may be used to perform the activity associated with the instructional media. Accordingly, such embodiments are intended to provide clarity and is not intended to suggest any limitation as to the scope of use or functionality of the embodiments.

In some embodiments, a processor may store historical data in a historical repository. Historical data may include instructional information associated with some or all of the instructions or commands a processor may have previously processed. This historical data may include instructions and/or instructional information associated with multiple users and/or various instructional medias associated with activities previously performed. In embodiments, a processor may access the historical repository and the historical data. A processor may analyze the historical data using AI and machine learning techniques (e.g., via instruction generation engine) to determine and identify if there is one or more instructions in the present instructional media. In embodiments, a processor may access and analyze historical data from the historical repository using AI and NLP capabilities to generate a knowledge corpus. In these embodiments, a processor may use the generated knowledge corpus to analyze and identify one or more instructions associated with instructional media (e.g., using NLP capabilities) and/or user commands.

In one example embodiment, a user could be playing a cooking tutorial (e.g., instructional media) on a laptop in a kitchen (e.g., smart environment) that provides a step by step audio instruction for baking cupcakes. In this example, a processor could use data collection devices to collect the audio (e.g., instructional information) continuously as the cooking tutorial is playing. In embodiments, a processor may also collect/receive instructional information from one or more data collection devices. This instructional information may include data associated with what smart devices occupy the smart environment. In some embodiments, each smart device may be uniquely identified with a unique key or name to enable the processor and user to easily differentiate between smart devices. For example, a processor could identify that the smart devices in the kitchen are smart lighting system, a smart oven, a smart toaster oven, a smart standing mixer, and smart refrigerator. In some embodiments, a processor may identify that there are smart devices configured within the smart environment that may not be used when performing the one or more instructions. For example, it is unlikely that in order to bake cupcakes a processor or user would need use a smart lighting system or a smart refrigerator to perform a particular instruction other than possibly housing ingredients. In embodiments, a processor may utilize historical data (e.g., via historical repository) stored overtime and using AI and machine learning techniques to determine the capability of each smart device (e.g., set of capabilities).

In embodiments, a processor may analyze the instructional media for one or more instructions. In these embodiments, a processor may use embodiments contemplated herein, such natural language processing (e.g., via AI and machine learning techniques), to analyze the instructional media and identify one or more instructions. Returning to the above cooking tutorial example, a processor may analyze the instructional media discussing how to bake cupcakes. In this example, a processor could collect instructional information from the cooking tutorial including, "preheat the oven to 400° F.," "measure a cup of milk and ¼ cup of butter into a small dish," and "combine the milk and butter mixture with the cupcake batter in a mixer and mix for five minutes at speed level 7." In embodiments, a processor may analyze the instructional information and identify one or more instructions that may be performed/executed by a smart device. From this instructional information a processor could determine instructions including, preheating the oven to 400° F. and mix the cupcake batter at level 7 and mix for five minutes. In some embodiments, a processor may determine that there are aspects of the instructional information that are required to be performed by a user because the instruction is outside the smart device's scope of capabilities. In the above example, a processor may determine a user will be required to measure the milk and butter as well as placing the milk and butter combination into the smart standing mixer as there is no smart device configured in the smart environment that is capable of performing such actions.

In embodiments, once a processor has analyzed and identified one or more instructions from the instructional information associated with the instructional media, a processor may determine how the instructions may be accomplished with the one or more smart devices configured within the smart environment. In embodiments, a processor may compare the at least one instruction to the capabilities (e.g., set of capabilities) associated with each of the one or more smart devices. In these embodiments, a processor may determine the meaning and impact of the one or more instructions (e.g., AI and machine learning techniques, knowledge corpus, etc.). In embodiments, a smart device from the one or more smart devices that has a capability that matches one or more instructions (e.g., instruction meaning) may be selected or identified as a target device. When the capability of a smart device matches an instruction, a processor will identify that smart device as the target device and instruct the target device to perform the one or more matching instructions.

In some embodiments, it is possible that more than one smart device may have one or more capabilities that match the one or more instructions. For example, returning to the above cupcake example, a processor may determine that the capabilities of the smart oven and the capabilities of the smart toaster oven both match the instruction preheating the oven to 400° F. In such embodiments, a processor may determine both smart devices may be used and may send a notification to the user. This notification may be audibly provided or displayed on a screen (e.g., laptop screen or screen associated with another smart device) for the user to review. In this notification, a processor may request the user to choose which smart device should be used to address the corresponding instruction (e.g., select the smart oven to bake the cupcakes). Alternatively, a processor may perform an analysis using historical data associated with each of the smart devices matching the one or more instructions. In these embodiments, a processor may determine which of the smart devices is more appropriate to address the one or more instruction may be based on the user's historical use of the smart device (e.g., the smart oven is more appropriate to bake cupcakes than a smart toaster oven). In these embodiments, the smart device considered most appropriate to address the one or more instructions may be considered the target device.

In some embodiments, a processor may determine the target device is not available. For example, in embodiments where a processor determines that a target device is already being used to perform/execute a different instruction or unrelated task, or the target device is not working properly (e.g., via one or more data collection devices), a processor may determine whether a replacement target device may be used to perform the at least one instruction. For example, while likely not ideal, a processor could identify the smart toaster oven as a replacement target device because the smart toaster oven may be considered to have similar capabilities to those of a smart oven.

In embodiments where a processor identifies more than one instruction from the instructional media, a processor may use instructional information to determine the sequence the instructions should be performed in. While in some embodiments, a processor may collect particular instructional information such as the timestamp of when the instruction was provided by the instructional media, in other embodiments, a processor may analyze historical information with AI and machine learning to determine an optimum sequence of instructions, regardless of the order the instructions may have been provided in the instructional media. For example, if a processor identifies two instructions from a cooking tutorial in the following order (though out of context of the instructional media), "mix ingredients in a mixer for 5 minutes to make frosting for the cupcakes" and "bake the cupcakes for 20 minutes 350° F.," the processor may determine whether this sequence of instructions is optimal (e.g., time efficient or energy efficient). In this particular example, even though the processor received the commands in the aforementioned order, the processor may use historical information to determine that it makes sense to being baking the cupcakes (e.g., send instructions to the smart oven) prior to instructing the mixer to mix the frosting components because the cupcakes can bake while the frosting is being made.

In embodiments, a processor may instruct the one or more smart devices configured within the smart environment while the user is performing one or more other actions based on the instructional media. These one or more other actions may be performed by a user if such actions are outside the capabilities of the smart devices. For example, a user may perform such actions as placing ingredients and particular dishes within smart devices, such as a smart microwave or a smart mixer. In embodiments where the user and the processor are collaboratively performing instructions from the instructional media, a processor may receive information associated with the user and what action the user is performing.

In such embodiments, a processor may use this information to predict or anticipate a user's actions. For example, based on the instructional media a processor and historical information associated with a user's past activities performed (e.g., performed with a different instructional media), a processor could predict that a user may require an hour to prepare ingredients. In this example, if a processor has also identified that the oven will need to be preheated, the processor may wait until the optimal time (e.g., the user has completed half of their one hour prep) to begin heating the smart oven to ensure resources are not wasted while waiting for the user. In some embodiments, a processor may use information associated with the user (e.g., collected with data collection devices) to observe the actions the user is performing and wait to perform an instruction until the user performs a particular action. For example, a processor may wait to instruct the smart mixer to begin mixing until the user has finished all of the ingredients to the mixing bowl.

In embodiments, a processor may receive a command from a user. While in some embodiments, this command may be based, at least in part, on the instructional media, in other embodiments, the command from the user may be independent of the instructional media. For example, the instructional media may instruct the user to perform a particular action, but the user may want to skip the action. In such embodiments, a processor may accept the user's command and let the command override the instructional media and associated instructional information.

In embodiments, a processor may generate one or more instructional suggestions for a user based, at least in part, on the instructional media. In such embodiments, a processor may analyze the instructional information and generate (e.g., using AI and machine learning capabilities) to instructional suggestion to the user that may enable the user to prepare for the next action (e.g., the next action that is beyond the capabilities of the smart devices). For example, based on the timeline needed to complete the activity, a processor may provide an instructional suggestion that indicates the user should preload ingredients, or other similar action, into a smart device. In some embodiments, a processor may analyze the user's actions and determine the user has forgotten an action or is inappropriately performing a particular action based on the instructional media. In these embodiments, a processor may issue the user a notification indicating the user has made an error. In some embodiments, a processor may generate a recommendation in the notification regarding how the user may remedy the error or forgotten action. In such embodiments, a processor may display the notification on a display within the smart environment.

In some embodiments, a processor may receive instructions from the instructional media within the same or similar timeframe as the processor receives a command issued by the user. In embodiments where the issued command is not in conflict with the instruction, a processor may execute both the issued command form the user and the instruction derived from the instructional media. As referenced herein, in embodiments where a processor determines that a command issued by a user is in conflict with the instructional media a processor may ensure that the user's issued command overrides the instructional media.

Figure 1:
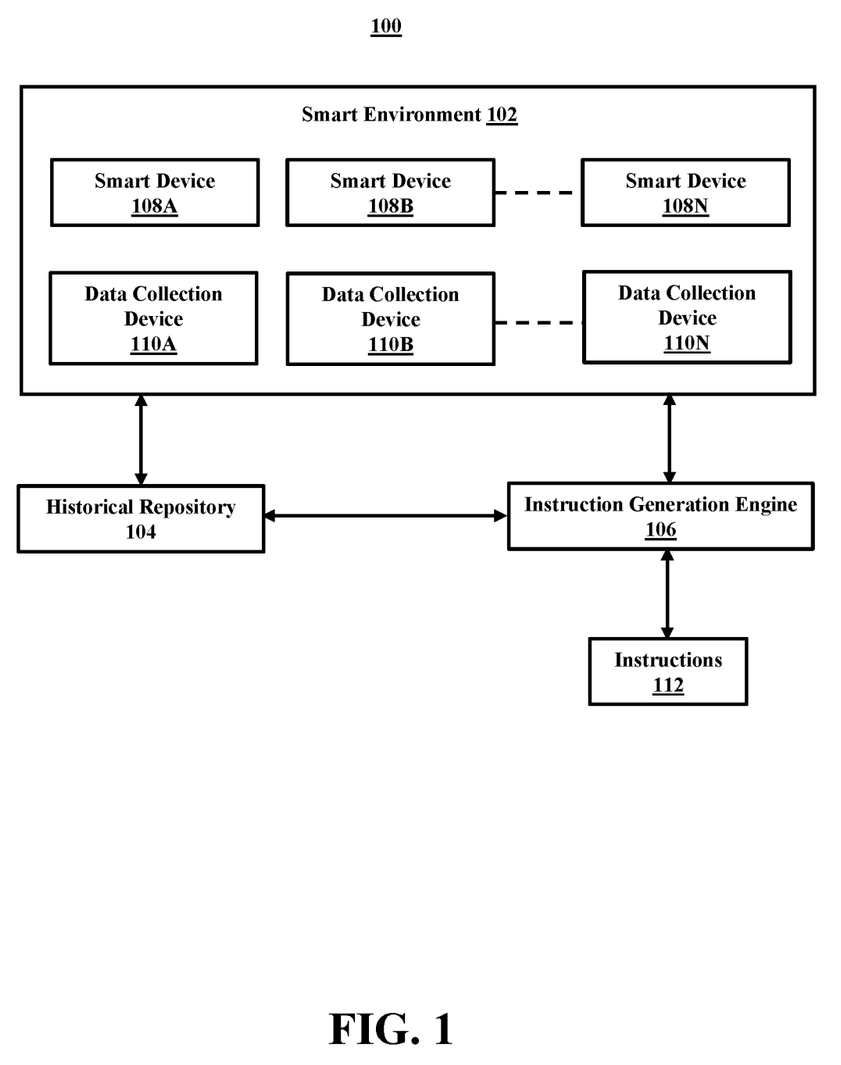
FIG. 1 depicts a block diagram of an embodiment of a smart environment, in accordance with the present disclosure.

Referring now to FIG. 1, a block diagram of an smart device management system 100 for managing smart devices in smart environment 102, is depicted in accordance with embodiments of the present disclosure. FIG. 1 provides an illustration of only one implementation and does not imply any limitations with regard to the environments in which different embodiments may be implemented. Many modifications to the depicted environment may be made by those skilled in the art without departing from the scope of the invention as recited by the claims.

In embodiments, smart device management system 100 may be configured to manage smart environment 102. In embodiments, smart device management system 100 may further include historical repository 104, and instruction generation engine 106. In embodiments, smart environment 102 may include one or more smart devices 108 (e.g., smart devices 108A-N) and one or more data collection devices 110 (e.g., data collection device 110A-110N). While in some embodiments, the one or more data collection devices 110 may be configured within the one or more smart devices 108, in other embodiments, the one or more data collection devices 110 may be configured independently of the one or more smart devices 108. In embodiments, smart device management system 100 may configure the one or more smart devices 108 to receive instruction from an instructional media played within smart environment 102. The instructional media may be provided in video or audio form and may be displayed on a personal smart device (e.g., mobile phone, laptop, etc.). In embodiments, smart device management system 100 may store historical instructional information associated with activities historically performed using instructional media in historical repository 104. In embodiments, smart device management system 100 may analyze the instructional information associated with smart environment 102, the instructional media and historical instructional information accessed from historical repository 104, using instruction generation engine 106. In embodiments, instruction generation engine 106 may be configured to perform any analyses contemplated herein including, but not limited to, analyses associated with AI, machine learning, NLP, or any combination thereof.

In embodiments, smart device management system 100 may configure instruction generation engine 106 to identify one or more instructions 112 from the instructional media. In some embodiments, smart device management system 100 may identify a target device by analyzing the smart environment for the one or more smart devices 108. In these embodiments, smart device management system 100 may be configured to determine a set of capabilities for each of the one or more smart devices 108. Smart device management system 100 may then compare the one or more instruction 112 to the set of capabilities associated with each of the one or more smart devices 108 and select a target device from the one or more smart devices 108, where the target device has a set of capabilities that matches one or more instructions 112. In these embodiments, smart device management system 100 may be configured to instruct the target device to perform one or more instructions 112. Such embodiments enable a user and one or more smart devices 108 to perform an activity, based on an instructive media, in a collaborative manner.

Figure 2:
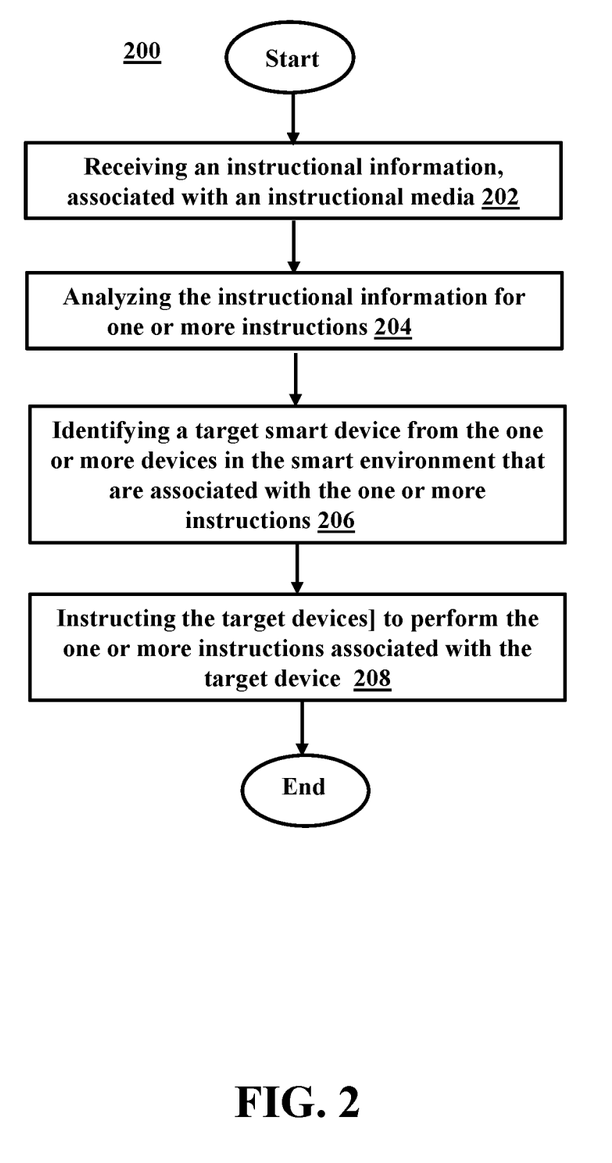
FIG. 2 illustrates a flowchart of a method for executing actions based on one or more instructions, in accordance with embodiments of the present disclosure.

Referring now to FIG. 2, a flowchart illustrating an example method 200 for executing actions based on one or more instructions, in accordance with embodiments of the present disclosure. FIG. 2 provides an illustration of only one implementation and does not imply any limitations with regard to the environments in which different embodiments may be implemented. Many modifications to the depicted environment may be made by those skilled in the art without departing from the scope of the invention as recited by the claims.

In some embodiments, the method 200 begins at operation 202 where a processor may receive instructional information. In some embodiments, the instructional information may be associated with the instructional media. In some embodiments, the method 200 proceeds to operation 204.

At operation 204, a processor may analyze the instructional information for at least one instruction. In some embodiments, the method 200 proceeds to operation 206.

At operation 206, a processor may identify a target device from the one or more smart devices in the smart environment that are associated with the at least one instruction. In some embodiments, the method 200 proceeds to operation 208.

At operation 208, a processor may instruct the target device to perform the at least one instruction associated with the target device. In some embodiments, as depicted in FIG. 2, after operation 208, the method 200 may end.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
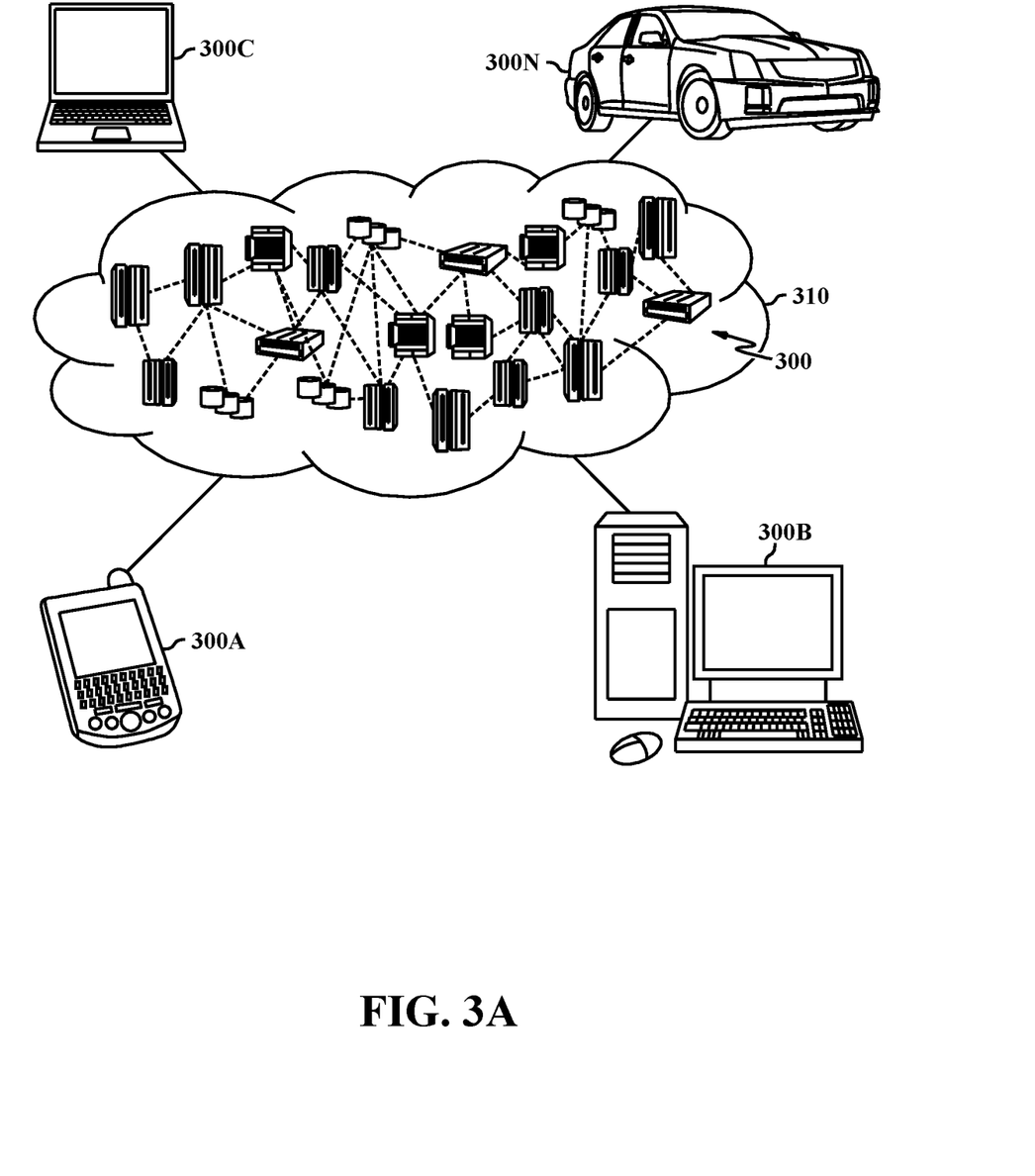
FIG. 3A illustrates a cloud computing environment, in accordance with embodiments of the present disclosure.

Referring now to FIG. 3A, illustrative cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof. This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing 300 and cloud computing environment 310 can communicate with any type of computerized device over any type of network and/or network addressable connection (e.g., using a web browser).

Figure 3B:
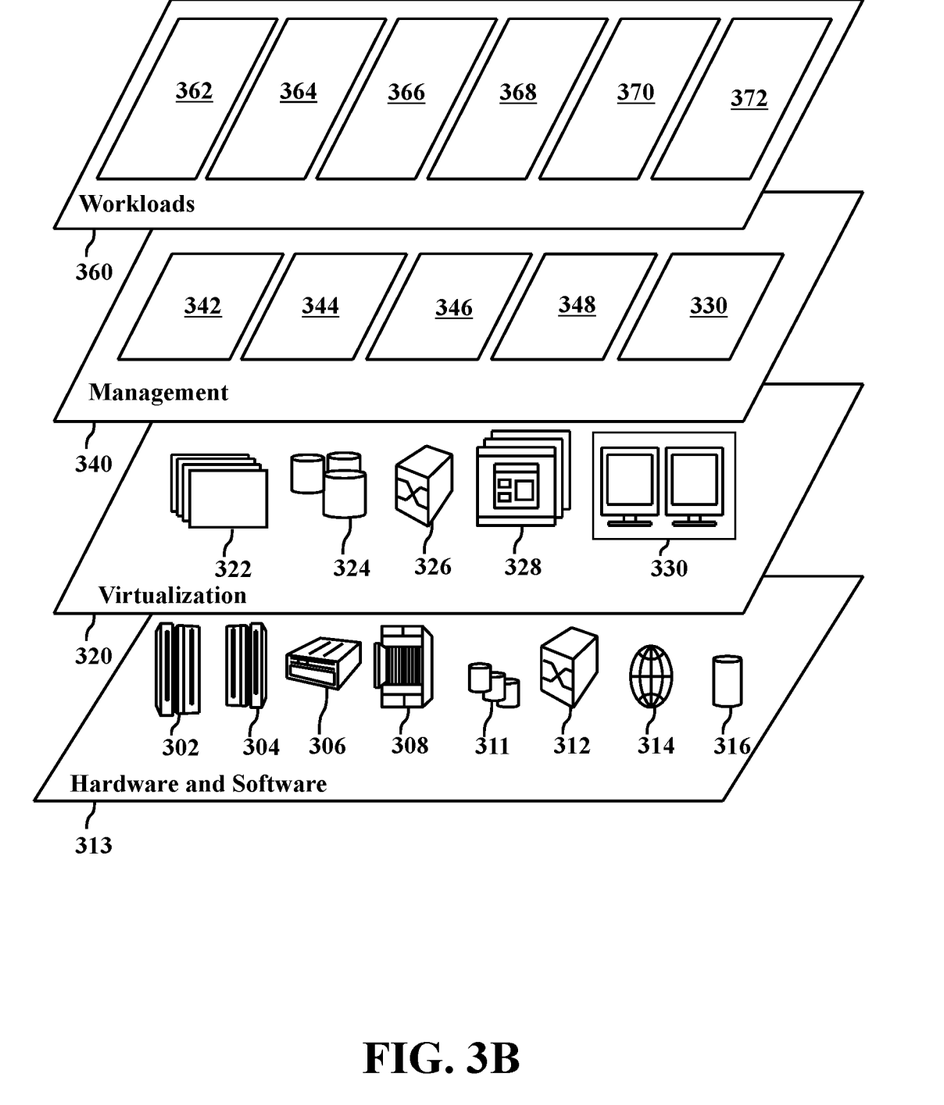
FIG. 3B illustrates abstraction model layers, in accordance with embodiments of the present disclosure.

Referring now to FIG. 3B, a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and smart environment device management 372.

Figure 4:
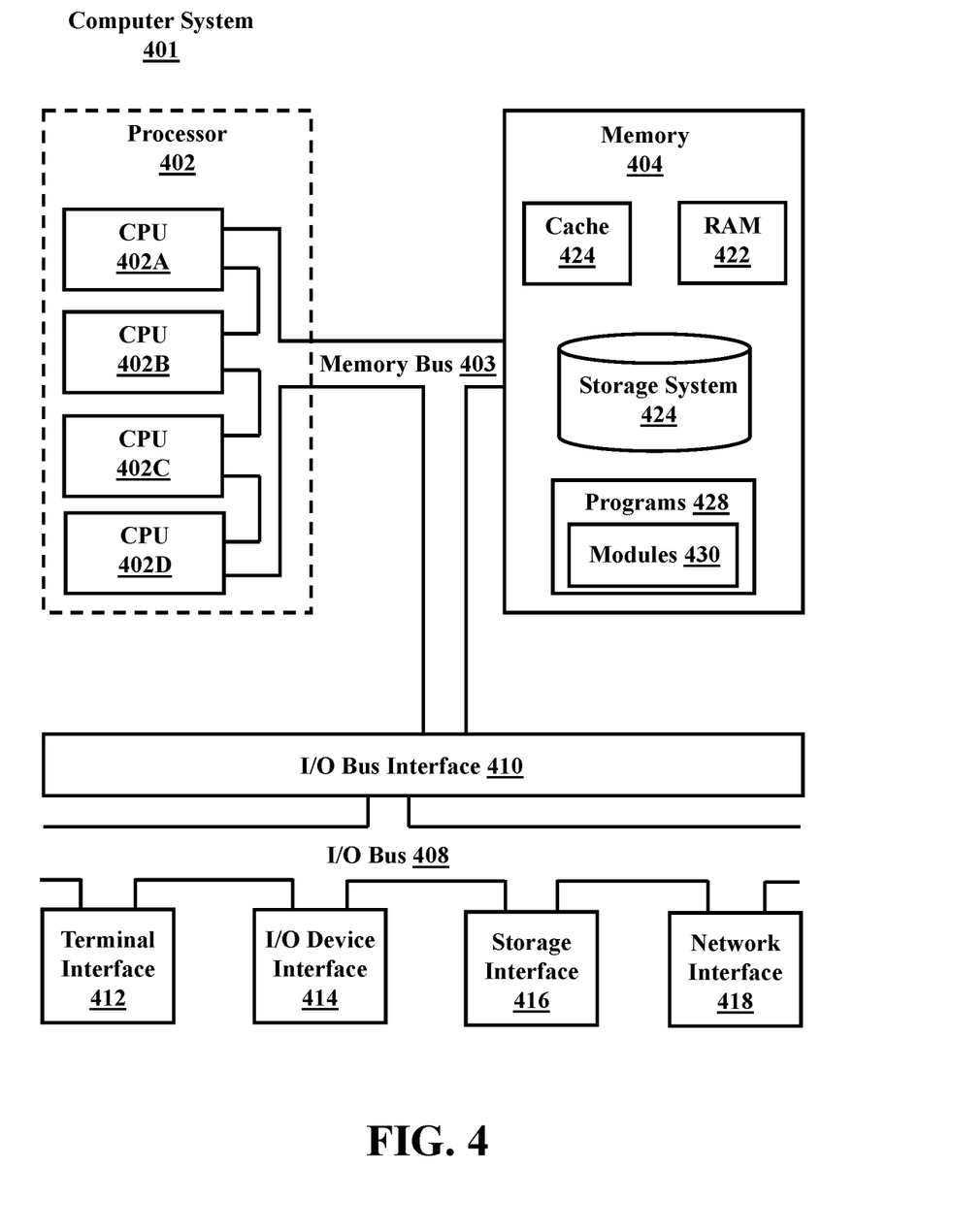
FIG. 4 illustrates a high-level block diagram of an example computer system that may be used in implementing one or more of the methods, tools, and modules, and any related functions, described herein, in accordance with embodiments of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present invention. In some embodiments, the major components of the computer system 401 may comprise one or more Processor 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method for managing one or more smart devices in a smart environment, the method comprising:
   receiving, by a processor, instructional information, wherein the instructional information is associated with an instructional media;
   analyzing the instructional information for one or more instructions requiring one or more capabilities associated with the one or more smart devices;
   identifying a target device from the one or more smart devices in the smart environment that are associated with the one or more instructions and the one or more capabilities;
   determining the target device cannot perform an instruction of the one or more instructions of the instructional media based on the one or more capabilities; and
   collaboratively performing the one or more instructions with a user and the target device, wherein collaboratively performing includes providing a user instruction to the user to provide an alternative associated with the one or more capabilities;
   identifying one or more user errors associated with the user instruction; and
   issuing a remedy recommendation associated with the one or more user errors.

2. The method of claim 1, wherein analyzing the instructional information for the one or more instructions, includes:
   performing an image content analysis on the instructional information;
   identifying an image within the instructional media; and
   performing the one or more instructions associated with the target device and the image.

3. The method of claim 1, wherein analyzing the instructional information for the one or more instructions, including:
   performing an audio content analysis on the instructional information;
   identifying an audio within the instructional media; and
   performing the one or more instructions associated with the target device and the audio.

4. The method of claim 1, further comprising:
   analyzing the smart environment for the one or more smart devices;
   determining the one or more capabilities for each of the one or more smart devices;
   comparing the one or more instructions to the one or more capabilities associated with each of the one or more smart devices; and
   selecting the target device, wherein the target device has one or more capabilities that matches the one or more instruction.

5. The method of claim 1, further comprising:
   determining the target device is not available; and
   identifying a replacement target device, wherein the replacement target device is configured to perform the one or more instructions.

6. The method of claim 1, further comprising:
   receiving a command from the user, wherein the command is based, at least in part, on the instructional media and included in the one or more instructions.

7. The method of claim 1, further comprising:
   generating one or more instructional suggestions for the user based, at least in part, on the instructional media.

8. A system for managing one or more smart devices in a smart environment, the system comprising:
   a memory; and
   a processor in communication with the memory, the processor being configured to perform operations comprising:
   receiving instructional information, wherein the instructional information is associated with an instructional media;
   analyzing the instructional information for one or more instructions requiring one or more capabilities associated with the one or more smart devices;
   identifying a target device from the one or more smart devices in the smart environment that are associated with the one or more instructions and the one or more capabilities;
   determining the target device cannot perform an instruction of the one or more instructions of the instructional media based on the one or more capabilities;
   collaboratively performing the one or more instructions with a user and the target device, wherein collaboratively performing includes providing a user instruction to the user to provide an alternative associated with the one or more capabilities;
   identifying one or more user errors associated with the user instruction; and
   issuing a remedy recommendation associated with the one or more user errors.

9. The system of claim 8, wherein analyzing the instructional information for the one or more instructions, includes:
   performing an image content analysis on the instructional information;
   identifying an image within the instructional media; and
   performing the one or more instructions associated with the target device and the image.

10. The system of claim 8, wherein analyzing the instructional information for the one or more instructions, including:
    performing an audio content analysis on the instructional information;
    identifying an audio within the instructional media; and
    performing the one or more instructions associated with the target device and the audio.

11. The system of claim 8, wherein the operations further comprising:
    analyzing the smart environment for the one or more smart devices;

determining the one or more capabilities for each of the one or more smart devices;

comparing the one or more instructions to the one or more capabilities associated with each of the one or more smart devices; and selecting the target device, wherein the target device has one or more capabilities that matches the one or more instruction.

12. The system of claim 8, wherein the operations further comprising:

determining the target device is not available; and identifying a replacement target device, wherein the replacement target device is configured to perform the one or more instructions.

13. The system of claim 8, wherein the operations further comprising:

receiving a command from the user, wherein the command is based, at least in part, on the instructional media and included in the one or more instructions.

14. The system of claim 8, wherein the operations further comprising:

generating one or more instructional suggestions for the user based, at least in part, on the instructional media.

15. A computer program product for managing one or more smart devices in a smart environment, the computer program product comprising a computer readable storage medium having program instructions embodied therewith, the program instructions executable by a processor to cause the processors to perform a function, the function comprising:

receiving instructional information, wherein the instructional information is associated with an instructional media;

analyzing the instructional information for one or more instructions requiring one or more capabilities associated with the one or more smart devices;

identifying a target device from the one or more smart devices in the smart environment that are associated with the one or more instructions and the one or more capabilities;

determining the target device cannot perform an instruction of the one or more instructions of the instructional media based on the one or more capabilities; and collaboratively performing the one or more instructions with a user and the target device, wherein collaboratively performing includes providing a user instruction to the user to provide an alternative associated with the one or more capabilities, identifying one or more user errors associated with the user instruction; and issuing a remedy recommendation associated with the one or more user errors.

16. The computer program product of claim 15, wherein analyzing the instructional information for the one or more instructions, including:

performing an audio content analysis on the instructional information;

identifying an audio within the instructional media; and performing the one or more instructions associated with the target device and the audio.

17. The computer program product of claim 15, wherein the function further comprising:

analyzing the smart environment for the one or more smart devices;

determining the one or more capabilities for each of the one or more smart devices;

comparing the one or more instructions to the one or more capabilities associated with each of the one or more smart devices; and selecting the target device, wherein the target device has one or more capabilities that matches the one or more instruction.

18. The computer program product of claim 15, wherein the function further comprising:

determining the target device is not available; and identifying a replacement target device, wherein the replacement target device is configured to perform the one or more instructions.

19. The computer program product of claim 15, wherein the function further comprising:

receiving a command from the user, wherein the command is based, at least in part, on the instructional media and included in the one or more instructions.

20. The computer program product of claim 15, wherein the function further comprising:

generating one or more instructional suggestions for the user based, at least in part, on the instructional media.

* * * * *